United States Patent
Emer et al.

(10) Patent No.: US 7,386,756 B2
(45) Date of Patent: Jun. 10, 2008

(54) REDUCING FALSE ERROR DETECTION IN A MICROPROCESSOR BY TRACKING INSTRUCTIONS NEUTRAL TO ERRORS

(75) Inventors: Joel S. Emer, Acton, MA (US);
Shubhendu S. Mukherjee, Framingham, MA (US); Steven K. Reinhardt, Ann Arbor, MI (US); Christopher T. Weaver, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 462 days.

(21) Appl. No.: 10/871,429

(22) Filed: Jun. 17, 2004

(65) Prior Publication Data

US 2005/0283685 A1  Dec. 22, 2005

(51) Int. Cl.
*G06F 11/00* (2006.01)
*G06F 11/10* (2006.01)

(52) U.S. Cl. ................ 714/6; 714/758; 714/780; 714/800

(58) Field of Classification Search .......... 714/52, 714/49, 6, 800, 54, 765, 780, 807, 811, 812, 714/758, 813
See application file for complete search history.

(56) References Cited

U.S. PATENT DOCUMENTS

| | | | |
|---|---|---|---|
| 3,531,631 A | 9/1970 | Burgess | 714/805 |
| 4,224,681 A * | 9/1980 | Lewine | 708/531 |
| 4,604,750 A * | 8/1986 | Manton et al. | 714/764 |
| 4,794,517 A | 12/1988 | Jones et al. | 712/32 |
| 4,888,679 A * | 12/1989 | Fossum et al. | 712/6 |
| 5,033,050 A | 7/1991 | Murai | 714/800 |
| 5,495,590 A | 2/1996 | Comfort et al. | 712/228 |
| 5,535,226 A | 7/1996 | Drake et al. | 714/773 |
| 5,649,090 A * | 7/1997 | Edwards et al. | 714/10 |
| 5,761,413 A * | 6/1998 | Frank et al. | 714/49 |
| 5,781,722 A * | 7/1998 | Buches, Jr. | 714/54 |
| 5,835,944 A * | 11/1998 | Lahti et al. | 711/118 |
| 5,872,910 A | 2/1999 | Kuslak et al. | 714/41 |

(Continued)

FOREIGN PATENT DOCUMENTS

EP  0 596 144  5/1994

(Continued)

OTHER PUBLICATIONS

Winn L. Rosch Hardware Bible, Sixth Edition by Winn L. Rosch, Publisher: Que Pub Date: Feb. 21, 2003, Print ISBN-10: 0-7897-2859-1, Print ISBN-13: 978-0-7897-2859-3.*

(Continued)

*Primary Examiner*—Scott Baderman
*Assistant Examiner*—Joseph Schell
(74) *Attorney, Agent, or Firm*—Trop, Pruner & Hu, P.C.

(57) ABSTRACT

A technique to reduce false error detection in microprocessors by tracking instructions neutral to errors. As an instruction is decoded, an anti-pi bit is tagged to the decoded instruction. When a parity error is detected, an instruction queue first checks if the anti-pi bit is set. If the anti-pi bit is set, then instruction is neutral to errors, and the pi bit need not be set. Prefetch, branch predict hint and NOP are types of instructions that are neutral to errors.

30 Claims, 4 Drawing Sheets

U.S. PATENT DOCUMENTS

| | | | |
|---|---|---|---|
| 6,247,118 B1 | 6/2001 | Zumkehr et al. | 712/228 |
| 6,253,306 B1* | 6/2001 | Ben-Meir et al. | 712/207 |
| 6,457,119 B1 | 9/2002 | Boggs et al. | 712/800 |
| 6,543,028 B1 | 4/2003 | Jamil et al. | 714/800 |
| 6,662,319 B1* | 12/2003 | Webb et al. | 714/52 |
| 6,675,341 B1 | 1/2004 | Chen et al. | 714/753 |
| 6,704,890 B1 | 3/2004 | Carotti et al. | 714/700 |
| 6,738,892 B1 | 5/2004 | Coon et al. | 712/24 |
| 6,785,842 B2 | 8/2004 | Zumkehr et al. | 714/17 |
| 6,862,677 B1 | 3/2005 | Stravers | 712/218 |
| 6,895,527 B1* | 5/2005 | Quach et al. | 714/5 |
| 6,944,791 B2* | 9/2005 | Humlicek et al. | 714/6 |
| 7,100,096 B2* | 8/2006 | Webb et al. | 714/52 |
| 2002/0078334 A1 | 6/2002 | Roth et al. | 712/244 |
| 2002/0199151 A1 | 12/2002 | Zuraski | 714/763 |
| 2004/0030959 A1 | 2/2004 | Quach et al. | 714/30 |
| 2004/0139374 A1 | 7/2004 | Meaney et al. | 714/48 |
| 2005/0138478 A1 | 6/2005 | Safford et al. | 714/38 |

FOREIGN PATENT DOCUMENTS

| | | |
|---|---|---|
| KR | 20010087046 | 9/2001 |
| WO | WO 03/098638 A1 | 11/2003 |

OTHER PUBLICATIONS

HP Pavillion PCs Made Easy by Nancy Stevenson, Publisher: Prentice Hall Pub Date: Aug. 29, 2002, Print ISBN-10: 0-13-100251-1, Print ISBN-13: 978-0-13-100251-7.*

Wikipedia's Classic RISC Pipeline revision from May 18, 2004, http://en.wikipedia.org/w/index.php?title=Classic_RISC_pipeline&oldid=5074869.*

Ziegler, J.F. et al., *IBM Experiments in Soft Fails in Computer Electronics*, IBM Journal of Research and Development, vol. 40, No. 1, Jan. 1996, pp. 3-18.

Normand, Eugene, *Single Event Upset at Ground Level*, IEEE Transactions on Nuclear Science, vol. 43, No. 6, Dec. 1996, pp. 2742-2750.

Choi, Youngsoo et al., *The Impact of If-Conversion and Branch Prediction on Program Execution on the Intel® ItaniumTM Processor*, Proceedings of the 34th Annual International Symposium on Microarchitecture, Austin, TX, Dec. 1-5, 2001, pp. 182-191.

Manne, Srilatha et al., *Pipeline Gating: Speculation Control for Energy Reduction*, Proceedings of the 25th Annual International Symposium on Computer Architecture, Barcelona, Spain, Jun. 27-Jul. 1, 1998, pp.132-141.

Mukherjee, Shubhendu S. et al., *Detailed Design and Evaluation of Redundant Multithreading Alternatives*, Proceedings of the 29th Annual International Symposium on Computer Architecture, Anchorage, AK, May 25-29, 2002, pp. 99-110.

Mukherjee, Shubhendu S. et al., *A Systematic Methodology to Compute the Architectural Vulnerability Factors for a High-Performance Microprocessor*, Proceedings of the 36th Annual International Symposium on Microarchitecture, Anaheim, CA, Dec. 3-5, 2003, pp. 29-40.

Reinhardt, Steven K. et al., *Transient Fault Detection* via *Simultaneous Multithreading*, Proceedings of the 27th Annual International Symposium on Computer Architecture, Vancouver, BC, Jun. 10-14, 2000, pp. 25-36.

European Patent Office, International Search Report And Written Opinion For International Application. No. PCT/US2005/017772, 12 pages, Oct. 18, 2005.

Korean Office Action dated Jun. 21, 2007 with English language translation.

* cited by examiner

REDUCING FALSE ERROR DETECTION IN A MICROPROCESSOR BY TRACKING INSTRUCTIONS NEUTRAL TO ERRORS

RELATED APPLICATIONS

This application relates to the following commonly assigned co-pending applications filed on even date herewith and entitled:

"Method And Apparatus For Reducing False Error Detection In A Microprocessor," Ser. No. 10/871,430, filed Jun. 17, 2004; and "Reducing False Error Detection In A Microprocessor By Tracking Dynamically Dead Instructions," Ser. No. 10/872,109, filed Jun. 17, 2004.

BACKGROUND INFORMATION

Transient faults due to neutron and alpha particle strikes are emerging as a significant obstacle to increasing processor transistor counts in future process technologies. Although fault rates of individual transistors may not rise significantly, incorporating more transistors into a device makes that device more likely to encounter a fault. As a result, it is expected that maintaining processor error rates at acceptable levels will require increasing design efforts.

Single bit upsets from transient faults have emerged as one of the key challenges in microprocessor design today. These faults arise from energetic particles, such as neutrons from cosmic rays and alpha particles from packaging materials. Transistor source and diffusion nodes can collect these charges. A sufficient amount of accumulated charge may invert the state of a logic device, such as an SRAM cell, a latch, or a gate, thereby introducing a logical fault into the circuit's operation. Because this type of fault does not reflect a permanent failure of the device, it is known as soft or transient error.

Soft errors are an increasing burden for microprocessor designers as the number of on-chip transistors continues to grow exponentially. The raw error rate per latch or SRAM bit is projected to remain roughly constant or decrease slightly for the next several technology generations. Thus, unless additional error protection mechanisms or usage of more robust technology (such as fully-depleted SOI), a microprocessor's error rate may grow in direct proportion to the number of devices added to a processor in each succeeding generation.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

Figure 1:
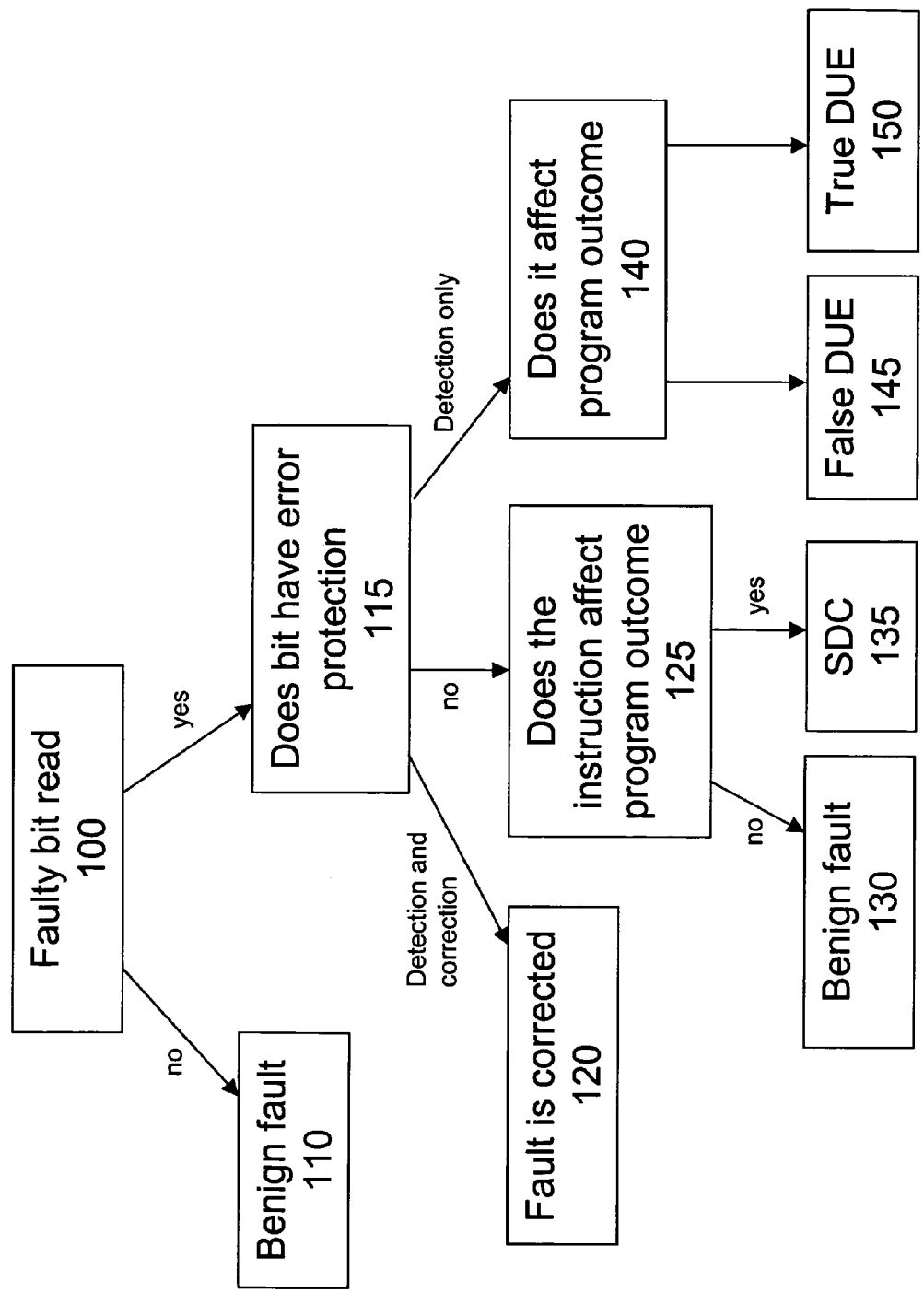
FIG. 1 is a block diagram of possible outcomes of a faulty bit in a microprocessor.

FIG. 1 illustrates possible outcomes of a single bit fault in a microprocessor. Initially, the microprocessor determines if a faulty bit was read 100. If a faulty bit was not read 110, then it is considered a benign fault and thus no error. If a faulty bit was read, the processor next determines if the bit has error protection 115. There are at least three possible outcomes to when a faulty bit is read. First, if the error protection was detected for the bit and corrected then the fault is considered corrected 120.

Secondly, if the bit does not have error protection, then the processor determines if the instruction would affect the outcome of the program 125. If the instruction does not affect the outcome of the program then the faulty bit is considered a benign fault 130. Faults 110, 120 and 130 all indicate non-error conditions because the fault had no effect or was detected and corrected.

If the instruction does affect the outcome of the program then it is considered a silent data corruption (SDC) 135. SDC 135 is the most insidious form of error, where a fault induces the system to generate erroneous outputs. To avoid SDC 135, designers may employ basic error detection mechanisms such as parity.

The third possible outcome to when a bit has error protection applies to this situation where the error is detected 140. With the ability to detect a fault but not correct it, the system avoids generating invalid outputs, but cannot recover when an error occurs. Thus, simple error detection does not reduce the error rate, but does provide fail-stop behavior and thereby reduces any data corruption. These types of errors are known as detected unrecoverable errors (DUE).

DUE events are further subdivided according to whether the detected errors would affect the final outcome of the execution. Benign detected errors are known as false DUE events 145 and others are known as true DUE events 150. In a microprocessor, false DUE events could arise from strikes on wrong-path instructions, falsely predicated instructions, and on correct-path instructions that do not affect the final program state, including no-ops, prefetches, and dynamically dead instructions.

To track false DUE events, the microprocessor may attach a bit known as a pi bit, for Possibly Incorrect, to every instruction and potentially to various hardware structures (discussed in detail in related application). When an error is detected, the hardware will set the pi bit of the affected instruction instead of signaling the error. Later, by examining the pi bit and identifying the nature of the instruction, the hardware can decide if indeed a visible error has occurred.

Distinguishing false errors from true errors is complicated. The processor may not have enough information to make this distinction at the point it detects the error. For instance, when the instruction queue detects an error on an instruction, it may not be able to tell whether the instruction was a wrong path instruction or not. Consequently, the processor may need to propagate the error information down the pipeline and raise the error when it has enough information to make this distinction.

To propagate the error information between different parts of the microprocessor hardware the system makes use of the pi bit. The pi bit is logically associated with each instruction as it flows down the pipeline from decode to retirement.

The pi bit mechanism helps avoid false positive matches from the fault detection mechanism, such as parity. Specifically, for an instruction, when an instruction is decoded, a pi bit is attached to the instruction and initialized to zero to denote that the instruction has not encountered any error. As the instruction flows through the pipeline, it will be transformed multiple times to adapt to the machine and written to and read from many different storage structures. If the storage structure has some form of fault detection, such as parity, and the instruction accumulates a single bit upset, the parity error will be flagged. Usually, this would raise a machine check exception, typically causing the machine to crash. Here, instead of the machine crashing, the processor posts this error in the pi bit by changing its value to one.

Error checking and updates of the pi bit may also be employed at multiple stages in the pipeline and/or on multiple of various structures in the course of instruction execution. Error checking logic may take the form of parity checkers or various other error detection techniques that are known or otherwise available. Moreover, error detection and correction techniques may be used at these various stages or on various structures, with the pi bit being set in the case of an unrecoverable error.

At a commit stage in the pipeline, the commit hardware has enough information to determine if the instruction was a wrong path instruction, falsely predicated instruction, or a NOP instruction. In these cases, the processor will not raise a machine check exception and will let the machine proceed normally. In other cases, however, it may have been a true error and must raise a machine check exception.

The pi bit may propagate (potential) error information between hardware structures, thereby delaying the machine check exception till the machine must absolutely declare the error. However, the pi bit by itself cannot tell if a particular structure encountered a fault and whether the fault will eventually be visible to the user.

Figure 2:
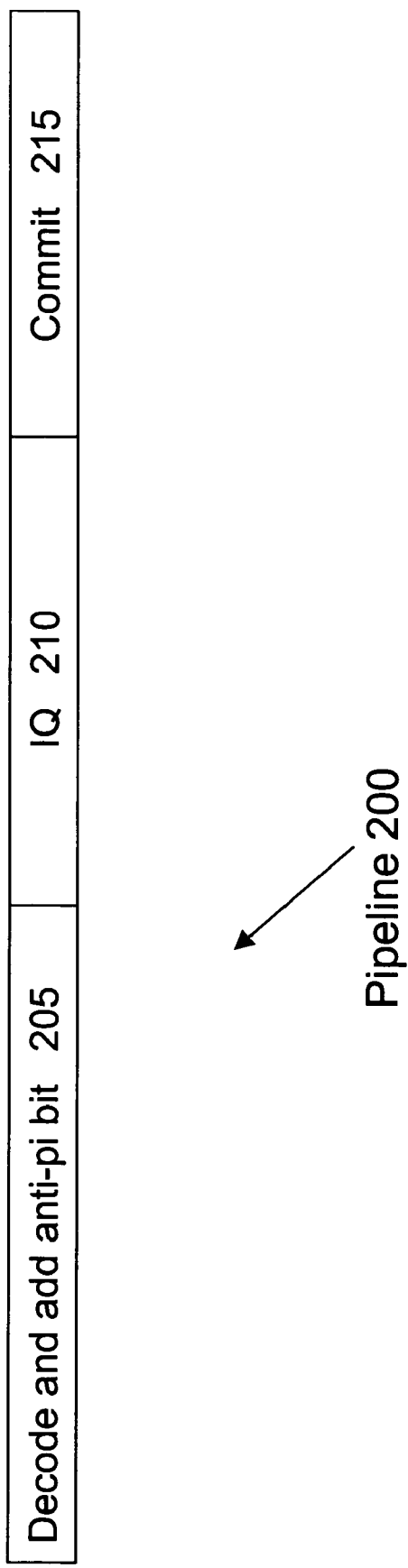
FIG. 2 is a block diagram illustrating one embodiment of the present invention when an anti-pi bit is used along an instruction flow path to indicate instructions neutral to errors.

FIG. 2 illustrates one embodiment of when an anti-pi bit is used along an instruction flow path to indicate instructions neutral to errors. There are many instances in a microprocessor where a fault on certain instruction types will not result in a user visible error and, thus, not affect the final outcome of a program. For example, a prefetch instruction that prefetches blocks of data from memory into the cache is not required for a program's correctness; rather, it is required for a program's performance. Similarly, the branch predict hint instruction in an architecture allows a program to boost its performance by providing the microprocessor hints about the control flow path of the program. There are other instruction types, such as NOPs, that have no effect on the microprocessor's correctness, but may be required to fill empty static instruction slots in a program. These types of instructions are known for being neutral to errors. Most bits of such instructions do not result in user visible error when struck with alpha or neutron particles causing a bit flip. Therefore, the hardware need not raise an error on non-opcode bits of such instructions.

As instructions, including those neutral to errors, flow through a pipeline 205, they reside in a variety of structures, buffers, and latches. One such structure is the instruction queue 210, where instructions reside till they are ready to be issued to execution units. However, as instructions pass through these different structures, their representation in the structure may change to suit the specific structure.

When the hardware accesses an instruction in the instruction queue 210 and detects a parity error, in the absence of the anti-pi bit, it will simply set the pi bit. However, as we stated above, instructions that are neutral to errors, need not have their pi bit set because such an error will not be visible to the user.

Instead, when an instruction is being decoded 200 early in the pipeline 205, another bit, known as an anti-pi bit, may be tagged to the decoded instruction. Then, when the instruction queue 210 detects a parity error on non-opcodes bits of a neutral instruction, the instruction queue 210 first checks the anti-pi bit. If the anti-pi bit is set, meaning the instruction is neutral to errors, it does not set the pi bit. Otherwise, it sets the pi bit for further processing later in the pipeline.

Eventually, the instruction will commit 215. At the commit stage, the commit hardware has enough information to determine if the instruction was a wrong path instruction and if it is an instruction neutral to errors. In other words, the anti-pi bit neutralizes the pi bit for neutral instruction types. Furthermore, in combination with the pi bit, the anti-pi bit helps further reduce the rate of false error detection.

Certain control bits in the instruction neutral to errors need special attention. For example, if the opcode bits of an instruction neutral to error get a strike, then the system may have to raise a machine check exception because it may be able to precisely identify the instruction type. However, protecting the anti-pi bit separately from the data and control bits allows the structure to avoid setting the pi bit on a fault in the control bits of an instruction neutral to errors. If the anti-pi bit has only error detection (via parity or circuit techniques), then on a parity error on the anti-pi bit, the hardware will have to raise a machine check. However, if the anti-pi bit has error recovery (via ECC or circuit techniques), then the hardware can even recover from faults in the anti-pi bit as well as those in the control and data bits of an entry.

Alternatively, another possible design exists with the anti-pi bit. In the design described earlier, individual structures examine the anti-pi bit to set the pi bit. Instead, individual structures can ignore the anti-pi bit when setting the pi bit. Then, at the commit stage 215, a retire unit could check both the anti-pi bit and pi bits to decide if it should raise a machine check exception.

The anti-pi bit mechanism can also be generalized to other hardware activities that are neutral to errors. For example, an error on an address generated by a hardware prefetches could be neutral to errors and be marked by an anti-pi bit.

Figure 3:
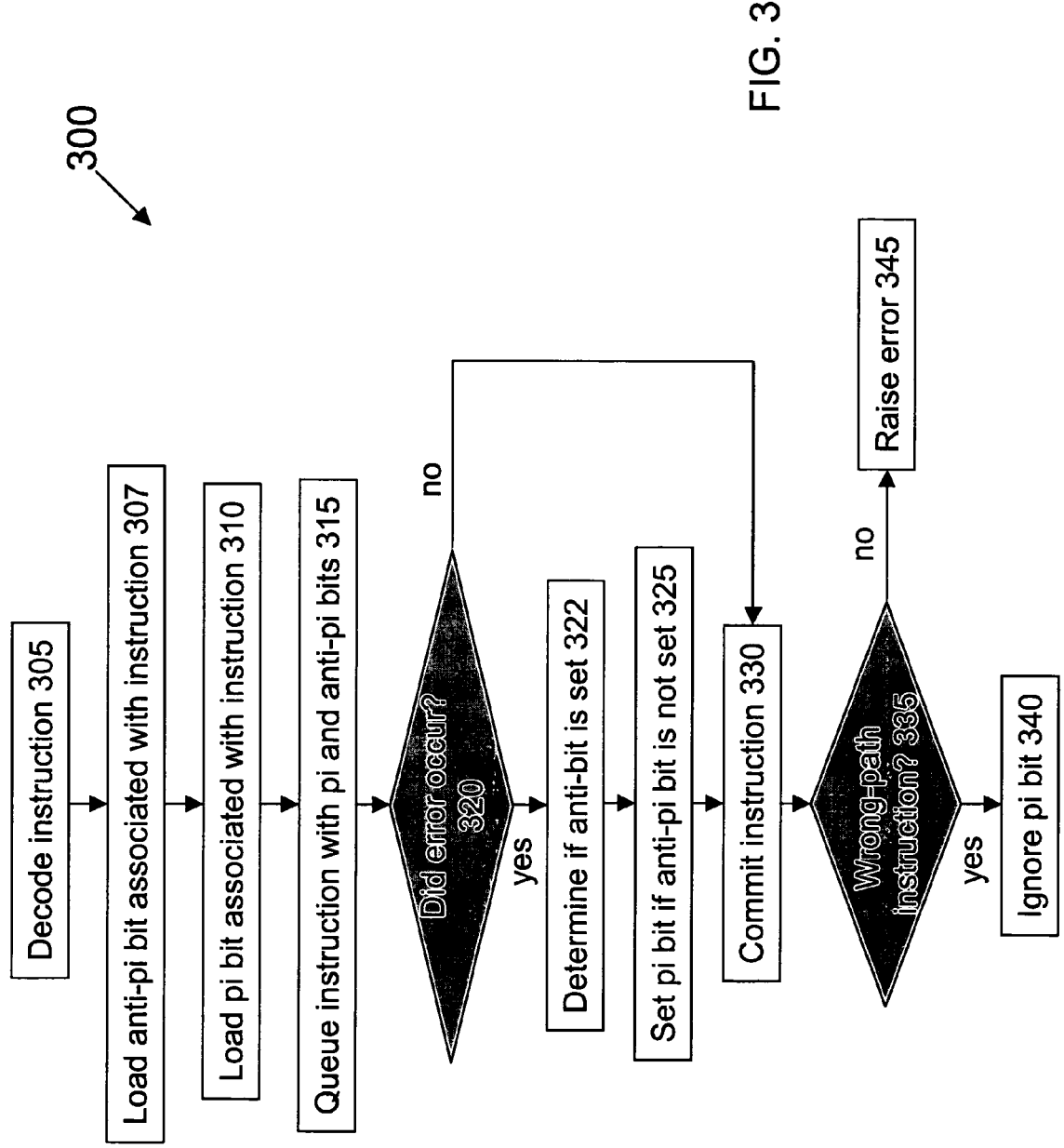
FIG. 3 is a flow diagram illustrating operations according to one embodiment of the present invention.

FIG. 3 is a flow diagram illustrating one embodiment of a method of detecting soft errors. In this particular embodiment, flowchart 300 illustrates a case where a processor determines if an error occurs on an instruction that is neutral to errors. Initially, when a instruction is decoded 305, an anti-pi bit 307 and a pit bit 310 is associated with the instruction. Next, the instruction, along with its anti-pi and pi bits, are queued in the pipeline 315. As the instruction flows through the pipeline, it will be transformed multiple times to adapt to the machine and written to and read from many different storage elements.

During the time when the instruction flows through the pipeline the instruction may accumulate a single bit upset and a parity error may be flagged for that instruction 320. If an error was detected for the instruction, the pipeline may set the affected instruction's anti-pi bit to one 322 if the instruction is determined to be one neutral to errors. If the instruction is not one that is neutral to errors, then the anti-pi bit is not set. The pi bit may only be set to one if the anti-pi bit is not set to one 325. The pi bit is set instead of raising a machine check exception. If an error is not detected, the instruction continues through the pipeline till it commits 330. The commit hardware may then determine it the instruction was a wrong path instruction 335. If the instruction is determined to be a wrong-path instruction, then the pi bit is ignored 340, otherwise the processor has the option to raise an error, such as a machine check error 345.

Figure 4:
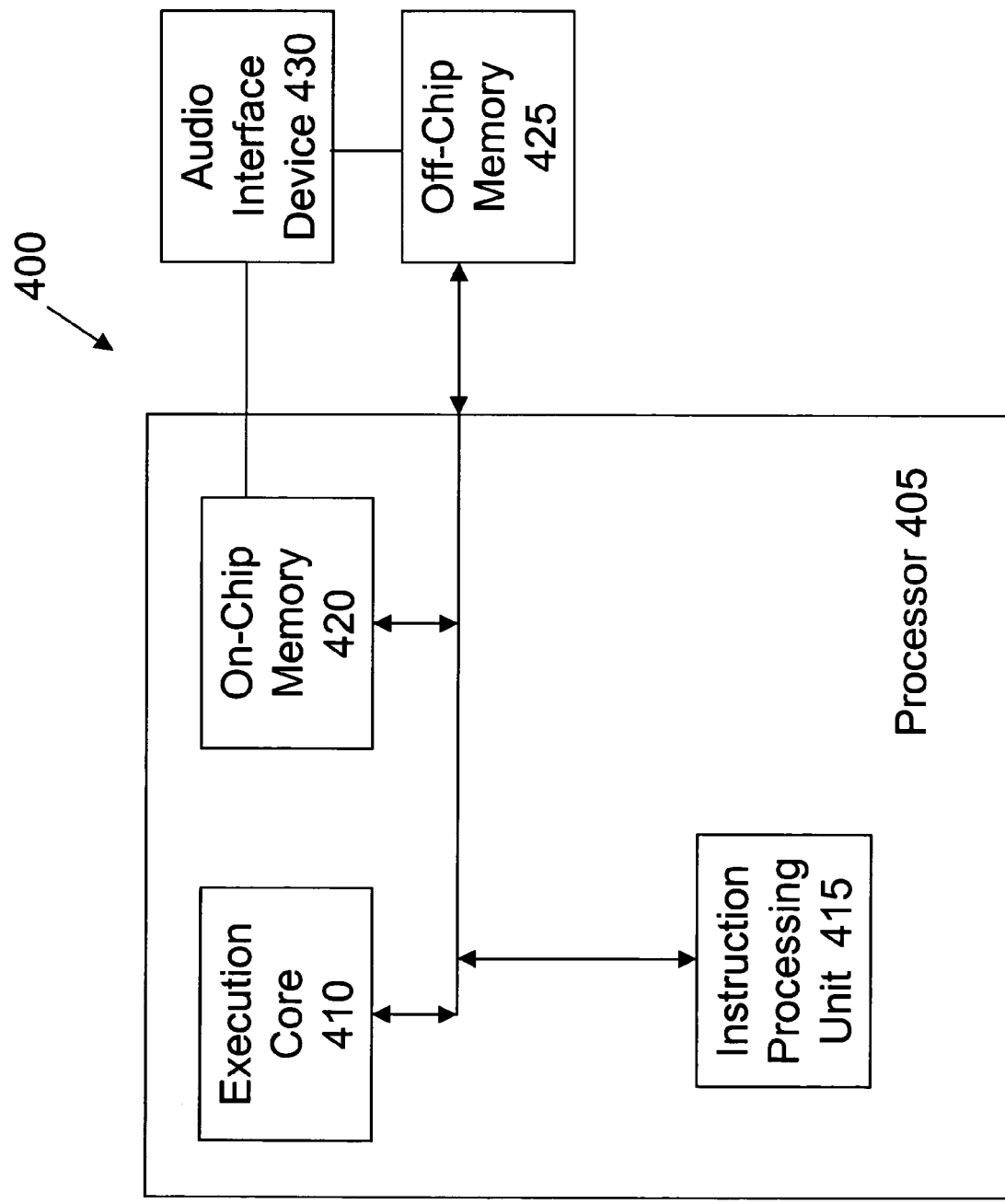
FIG. 4 is a block diagram illustrating an exemplary computer system which implements the present invention to detect soft errors.

FIG. 4 illustrates one typical system implementation for the detecting soft errors. A computer 400 is shown in which a processor 405 functions as a sole or one of a plurality of processors comprising the central processing unit (CPU) or units of the computer 400. Typically, the processor 405 is embodied in a single integrated circuit chip. The processor 405 may include an execution (processing) core 410, which has one or more execution units. A section of the processor 405 is dedicated to include an instruction processing apparatus 415. The instruction processing apparatus 415 is shown coupled to the core 410.

The invention is practiced according to the description above to execute an instruction in the core 410. The memory can be located on-chip (as shown by on-chip memory 420) or off-chip (as shown by off-chip memory 425). Typically, the on-chip memory can be a cache memory or part of the main memory (RAM). The off-chip memory is typically comprised of main memory (as well as off-chip cache, if present) and other memory devices, such as a disk storage medium. Both the on-chip memory 420 and the off-chip memory 425, either individually or separately, may be connected to various devices, such as, an audio interface device 430. However, it is to be noted, that the invention can be configured in other ways to process the instructions for execution by the core 410.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

What is claimed is:

1. A processor comprising:
  a decode module to decode an instruction, associate a first bit with the decoded instruction, wherein the first bit is to indicate that the instruction is neutral to an error, and to associate a second bit with the decoded instruction, wherein the second bit is to identify an error on the instruction; and
  a storage structure, coupled to the decode module, to detect the error on the instruction, wherein the storage structure is to check the first bit and if the first bit is set then not set the second bit, wherein the storage structure is to detect the error on non-opcode bits of the decoded instruction, the first bit is to be set based on a type of instruction and the instruction is a branch predict hint instruction.

2. The processor of claim 1 wherein if the error is detected, the storage structure is to set the second bit if the first bit is not set.

3. The processor of claim 1 further comprising an instruction processing unit, coupled to the storage structure, comprised of a plurality of stages to process the decoded instruction.

4. The processor of claim 3 wherein the instruction is to issue and flow through the plurality of stages.

5. The processor of claim 1 wherein the error is a parity error.

6. The processor of claim 1 wherein the instruction is NOP instruction.

7. The processor of claim 1 wherein the instruction is a prefetch instruction.

8. The processor of claim 1 wherein the storage structure is an instruction queue.

9. A method comprising:
  decoding an instruction;
  loading a first bit along with the instruction;
  loading a second bit along with the instruction;
  detecting a fault;
  checking the first bit, after detecting the fault, to determine if it is set; and
  setting the second bit only if the first bit is not set.

10. The method of claim 9 wherein the first bit is to indicate that the instruction is neutral to errors.

11. The method of claim 10 further comprising detecting the fault on non-opcode bits of the instruction.

12. The method of claim 9 further comprising:
  queuing the instruction;
  propagating the instruction through stages of a pipeline to process the instruction; and
  determining if the instruction is a wrong path instruction.

13. An apparatus comprising:
  a decode module to decode an entry; and
  a storage element, coupled to the decode module, to store a first detection bit associated with the entry and to store a second detection bit associated with the entry, the second detection bit to identify if a bit state change occurred to corrupt the entry, wherein the second detection bit is to be set after detection of the bit state change and only after a determination that the first detection bit is not set.

14. The apparatus of claim 13 further comprising:
  an instruction queue to process the entry; and
  an instruction flow path to propagate entries through multiple stages.

15. The apparatus of claim 14 further comprising a commit module to determine if an entry is on a wrong path.

16. The apparatus of claim 14 wherein the entry is to issue and flow through the multiple stages of the instruction flow path.

17. The apparatus of claim 14 wherein the first detection bit is to be set for entries neutral to errors.

18. The apparatus of claim 13 wherein the bit state change is to occur on non-opcode bits of the entry.

19. The apparatus of claim 18 wherein the first detection bit is to be set for a NOP instruction.

20. The apparatus of claim 18 wherein the first detection bit is to be set for a prefetch instruction.

21. The apparatus of claim 18 wherein the first detection bit is to be set for a branch predict hint instruction.

22. A system comprising:
  an off-chip memory to store an entry prior to fetching;
  a processor coupled to the off-chip memory, wherein the processor further comprises:
    a decode module to receive an entry; and
    a storage element to store a first and second bit associated with the entry, wherein the second bit is to be set after detection of a bit state change that corrupts the entry and after checking that the first bit is not set.

23. The system of claim 22 further comprising:
an instruction queue to process the entry;
an instruction flow path to propagate entries through multiple stages; and
a commit module to determine if an entry is on a wrong path.

24. The system of claim 22 further comprising:
an on-chip memory; and
an audio interface device coupled to the on-chip memory.

25. The system of claim 22 further comprising an audio interface device coupled to the off-chip memory.

26. The system of claim 22 wherein the bit state change is to occur on non-opcode bits of the entry.

27. The system of claim 22 wherein the first bit is to be set for a NOP entry.

28. The system of claim 22 wherein the first bit is to be set for a prefetch entry.

29. The system of claim 22 wherein the first bit is to be set for a branch predict hint entry.

30. The system of claim 22 wherein the first bit is to be set for an entry neutral to errors.

* * * * *